US012695188B2

(12) United States Patent
Chang et al.

(10) Patent No.: US 12,695,188 B2
(45) Date of Patent: Jul. 28, 2026

(54) MOBILE DEVICE SUPPORTING WIDEBAND OPERATION

(71) Applicant: Acer Incorporated, New Taipei City (TW)

(72) Inventors: Kun-Sheng Chang, New Taipei City (TW); Ching-Chi Lin, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 32 days.

(21) Appl. No.: 18/944,522

(22) Filed: Nov. 12, 2024

(65) Prior Publication Data

US 2026/0011917 A1 Jan. 8, 2026

(30) Foreign Application Priority Data

Jul. 5, 2024 (TW) ................................ 113125204

(51) Int. Cl.
*H01Q 1/22* (2006.01)
*H01Q 5/20* (2015.01)
*H01Q 9/04* (2006.01)

(52) U.S. Cl.
CPC ................. *H01Q 5/20* (2015.01); *H01Q 1/22* (2013.01); *H01Q 9/0421* (2013.01)

(58) Field of Classification Search
CPC ............ H01Q 1/22; H01Q 1/243; H01Q 5/30; H01Q 9/0421; H01Q 9/42; H01Q 5/378–392
See application file for complete search history.

(56) References Cited

U.S. PATENT DOCUMENTS 10,910,698 B2 * 2/2021 Wei ........................ H01Q 5/357
11,239,559 B2 * 2/2022 Peng ........................ H01Q 5/28
(Continued)

FOREIGN PATENT DOCUMENTS

TW 201419660 A 5/2014
TW 202023113 A 6/2020
(Continued)

OTHER PUBLICATIONS

Chinese language office action dated Oct. 27, 2025, issued in application No. TW 113125204.
(Continued)

*Primary Examiner* — Hasan Islam
(74) *Attorney, Agent, or Firm* — McClure, Qualey & Rodack, LLP

(57) ABSTRACT

A mobile device supporting wideband operations includes a metal mechanism element, a feeding radiation element, a shorting radiation element, a main radiation element, a connection radiation element, and an auxiliary radiation element. The metal mechanism element provides a ground voltage. The feeding radiation element has a feeding point. The feeding radiation element is coupled through the shorting radiation element to the metal mechanism element. The main radiation element is coupled to the feeding radiation element. The connection radiation element is coupled to the main radiation element. The auxiliary radiation element is coupled to the connection radiation element. An antenna structure is formed by the feeding radiation element, the shorting radiation element, the main radiation element, the connection radiation element, and the auxiliary radiation element. The width of the main radiation element is greater than that of the auxiliary radiation element.

14 Claims, 4 Drawing Sheets

(56) References Cited

U.S. PATENT DOCUMENTS

| | | | | |
|---|---|---|---|---|
| 11,563,275 | B2 * | 1/2023 | Wei | H01Q 5/328 |
| 2024/0195082 | A1 * | 6/2024 | Lo | H01Q 5/378 |

FOREIGN PATENT DOCUMENTS

| | | | |
|---|---|---|---|
| TW | 202318717 | A | 5/2023 |
| TW | I821856 | B | 11/2023 |

OTHER PUBLICATIONS

Chinese language office action dated Apr. 24, 2025, issued in application No. TW 113125204.

* cited by examiner

MOBILE DEVICE SUPPORTING WIDEBAND OPERATION

CROSS REFERENCE TO RELATED APPLICATIONS

This application claims priority of Taiwan Patent Application No. 113125204 filed on Jul. 5, 2024, the entirety of which is incorporated by reference herein.

BACKGROUND OF THE INVENTION

Field of the Invention

The disclosure generally relates to a mobile device, and more particularly, to a mobile device supporting wideband operations.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHZ, 1800 MHz, 1900 MHZ, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient operational bandwidth, it may degrade the communication quality of the relative mobile device. Accordingly, it has become a critical challenge for designers to design a small-size, wideband antenna structure.

BRIEF SUMMARY OF THE INVENTION

In an exemplary embodiment, the invention is directed to a mobile device supporting wideband operations. The mobile device includes a metal mechanism element, a feeding radiation element, a shorting radiation element, a main radiation element, a connection radiation element, and an auxiliary radiation element. The metal mechanism element provides a ground voltage. The feeding radiation element has a feeding point. The feeding radiation element is coupled through the shorting radiation element to the metal mechanism element. The main radiation element is coupled to the feeding radiation element. The connection radiation element is coupled to the main radiation element. The auxiliary radiation element is coupled to the connection radiation element. An antenna structure is formed by the feeding radiation element, the shorting radiation element, the main radiation element, the connection radiation element, and the auxiliary radiation element. The width of the main radiation element is greater than the width of the auxiliary radiation element.

In some embodiments, the metal mechanism element is a host housing, and the antenna structure is disposed at the edge of the metal mechanism element.

In some embodiments, the feeding radiation element and the main radiation element are respectively disposed on two orthogonal planes.

In some embodiments, the main radiation element and the auxiliary radiation element are respectively disposed on two parallel planes.

In some embodiments, the connection radiation element is perpendicular to the main radiation element and the auxiliary radiation element.

In some embodiments, the antenna structure covers a first frequency band and a second frequency band. The first frequency band is from 2400 MHz to 2500 MHz. The second frequency band is from 5150 MHz to 5850 MHz.

In some embodiments, the total length of the main radiation element, the connection radiation element, and the auxiliary radiation element is substantially equal to 0.5 wavelength of the first frequency band.

In some embodiments, the length of the main radiation element is substantially equal to 0.375 wavelength of the first frequency band.

In some embodiments, the length of the auxiliary radiation element is shorter than or equal to 0.25 wavelength of the second frequency band.

In some embodiments, the distance between the main radiation element and the metal mechanism element is shorter than or equal to 4.5 mm.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
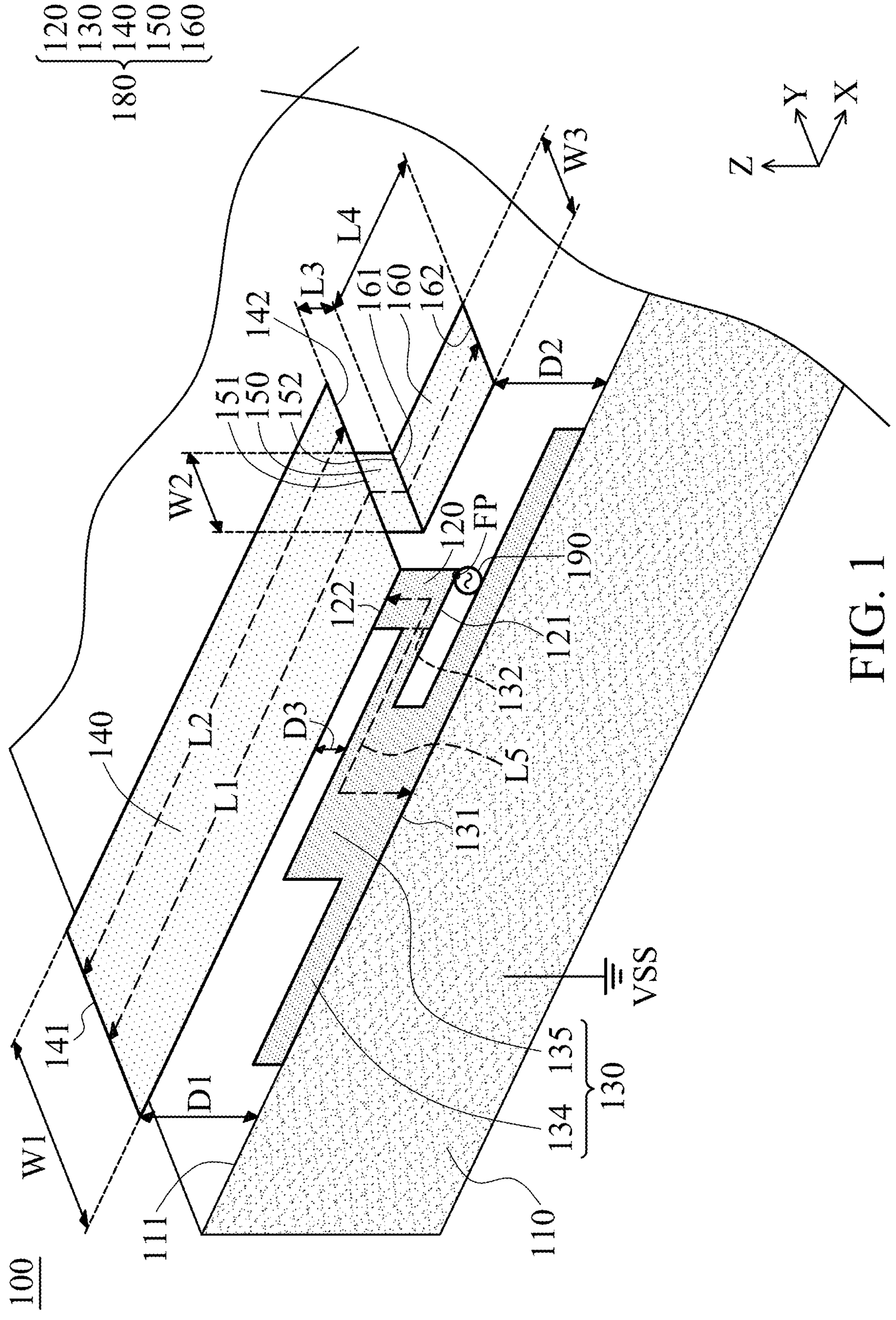
FIG. 1 is a perspective view of a mobile device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a perspective view of a mobile device 100 according to an embodiment of the invention. For example, the mobile device 100 may be a portable host device, which may be applied to a desktop computer. Alternatively, the mobile device 100 may be a notebook computer or a wireless router, but it is not limited thereto. As shown in FIG. 1, the mobile device 100 at least includes a metal mechanism element, 110, a feeding radiation element 120, a shorting radiation element 130, a main radiation element 140, a connection radiation element 150, and an auxiliary radiation element 160. The feeding radiation element 120, the shorting radiation element 130, the main radiation element 140, the connection radiation element 150, and the auxiliary radiation element 160 may all be made of metal materials, such as copper, silver, aluminum, iron, or their alloys. It should be understood that the mobile device 100 may further include other components, such as a processor, an I/O (Input/Output) interface, and/or a power supply module.

The metal mechanism element 110 is configured to provide a ground voltage VSS. In some embodiments, the metal mechanism element 110 is a host housing. For example, the metal mechanism element 110 may be substantially a hollow cuboid, a hollow cube, or a hollow cylinder, but it is not limited thereto. It should be understood that the metal mechanism element 110 can be considered as a system ground element of the mobile device 100.

The feeding radiation element 120 may substantially have a rectangular shape. Specifically, the feeding radiation element 120 has a first end 121 and a second end 122. A feeding point FP is positioned at the first end 121 of the feeding radiation element 120. The feeding point FP may be further coupled to a positive electrode of a signal source 190. For example, the signal source 190 may be an RF (Radio Frequency) module.

The shorting radiation element 130 may substantially have an irregular shape. Specifically, the shorting radiation element 130 has a first end 131 and a second end 132. The first end 131 of the shorting radiation element 130 is coupled to the metal mechanism element 110. The second end 132 of the shorting radiation element 130 is coupled to the first end 121 of the feeding radiation element 120. Thus, the feeding radiation element 120 is coupled through the shorting radiation element 130 to the metal mechanism element 110. In some embodiments, the shorting radiation element 130 includes a wide portion 134 adjacent to the first end 131, and a narrow portion 135 adjacent to the second end 132. Furthermore, a negative electrode of the signal source 190 is coupled to the wide portion 134 of the shorting radiation element 130. It should be noted that the term “adjacent” or “close” over the disclosure means that the distance (spacing) between two corresponding elements is smaller than a predetermined distance (e.g., 10 mm or shorter), or means that the two corresponding elements directly touch each other (i.e., the aforementioned distance/spacing between them is reduced to 0).

The main radiation element 140 may substantially have a relatively long straight-line shape. Specifically, the main radiation element 140 has a first end 141 and a second end 142. The first end 141 of the main radiation element 140 is an open end. The second end 142 of the main radiation element 140 is coupled to the second end 122 of the feeding radiation element 120. In some embodiments, the feeding radiation element 120 and the main radiation element 140 are respectively disposed on two orthogonal planes. For example, the main radiation element 120 and the shorting radiation element 130 may be positioned on a first plane parallel to the XZ-plane, and the main radiation element 140 may be positioned on a second plane parallel to the XY-plane, but they are not limited thereto.

The connection radiation element 150 may substantially have another rectangular shape. Specifically, the connection radiation element 150 has a first end 151 and a second end 152. The first end 151 of the connection radiation element 150 is coupled to the second end 142 of the main radiation element 140. In some embodiments, the connection radiation element 150 is perpendicular to both of the main radiation element 140 and the auxiliary radiation element 160. For example, the connection radiation element 150 may be positioned on a third plane parallel to the YZ-plane, but it is not limited thereto.

The auxiliary radiation element 160 may substantially have a relatively short straight-line shape (compared with the main radiation element 140). Specifically, the auxiliary radiation element 160 has a first end 161 and a second end 162. The first end 161 of the auxiliary radiation element 160 is coupled to the second end 152 of the connection radiation element 150. The second end 162 of the auxiliary radiation element 160 is an open end. Thus, the auxiliary radiation element 160 is coupled through the connection radiation element 150 to the main radiation element 140. For example, the first end 141 of the main radiation element 140 and the second end 162 of the auxiliary radiation element 160 may substantially extend in opposite directions and away from each other. In some embodiments, the main radiation element 140 and the auxiliary radiation element 160 are respectively disposed on two parallel planes. For example, the main radiation element 140 may be positioned on the second plane parallel to the XY-plane, and the auxiliary radiation element 160 may be positioned on a fourth plane parallel to the XY-plane. The fourth plane may be different from the second plane, but they are not limited thereto. It should be noted that the width W1 of the main radiation element 140 is greater than the width W2 of the connection radiation element 150, and is also greater than the width W3 of the auxiliary radiation element 160. In addition, the width W2 of the connection radiation element 150 may be exactly the same as the width W3 of the auxiliary radiation element 160.

In a preferred embodiment, an antenna structure 180 of the mobile device 100 is formed by the feeding radiation element 120, the shorting radiation element 130, the main radiation element 140, the connection radiation element 150, and the auxiliary radiation element 160. For example, the antenna structure 180 may be a 3D (Three-Dimensional) antenna structure. According to practical measurement, if the antenna structure 180 is disposed at the edge 111 of the metal mechanism element 110, the radiation performance of the antenna structure 180 will not tend to be negatively affected by the metal mechanism element 110.

Figure 2:
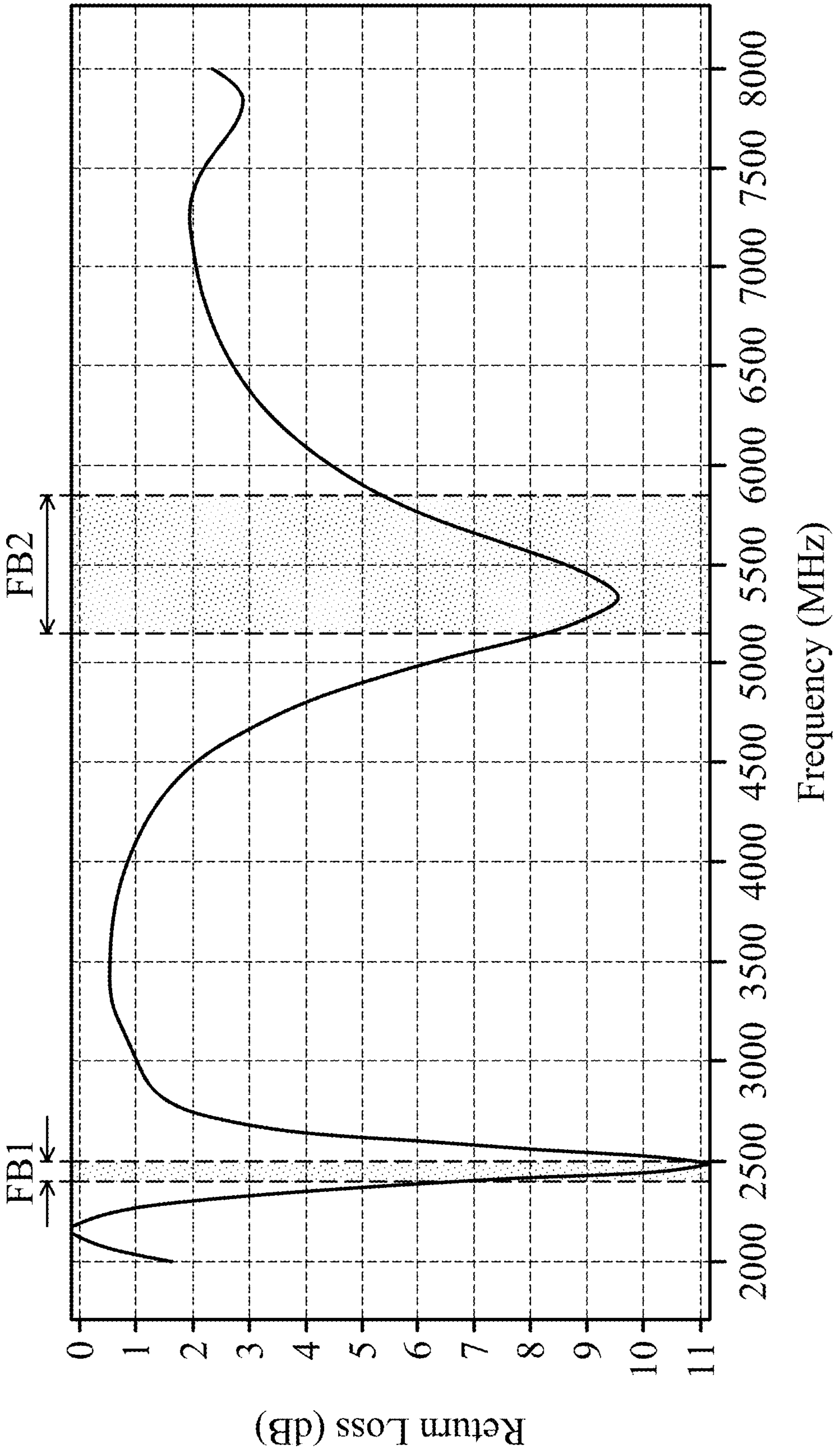
FIG. 2 is a diagram of return loss of an antenna structure of a mobile device according to an embodiment of the invention.

FIG. 2 is a diagram of return loss of the antenna structure 180 of the mobile device 100 according to an embodiment of the invention. The horizontal axis represents the operational frequency (MHz), and the vertical axis represents the return loss (dB). According to the measurement of FIG. 2, the antenna structure 180 of the mobile device 100 can cover a first frequency band FBI and a second frequency band FB2. For example, the first frequency band FB1 may be from 2400 MHz to 2500 MHz, and the second frequency band FB2 may be from 5150 MHz to 5850 MHz. Therefore, the mobile device 100 can support at least the wideband operations of WLAN (Wireless Local Area Network).

The operational principles in some embodiments of the antenna structure 180 of the mobile device 100 are described below. The main radiation element 140, the connection radiation element 150, and the auxiliary radiation element 160 can be excited to generate the first frequency band FB1. The feeding radiation element 120, the shorting radiation element 130, the connection radiation element 150, and the auxiliary radiation element 160 can be excited to generate the second frequency band FB2. According to practical measurements, the variable-width and variable-height design of the antenna structure 180 can help to suppress its inductive characteristics, thereby fine-tuning the impedance matching of the second frequency band FB2 and also increasing its operational bandwidth.

Figure 3:
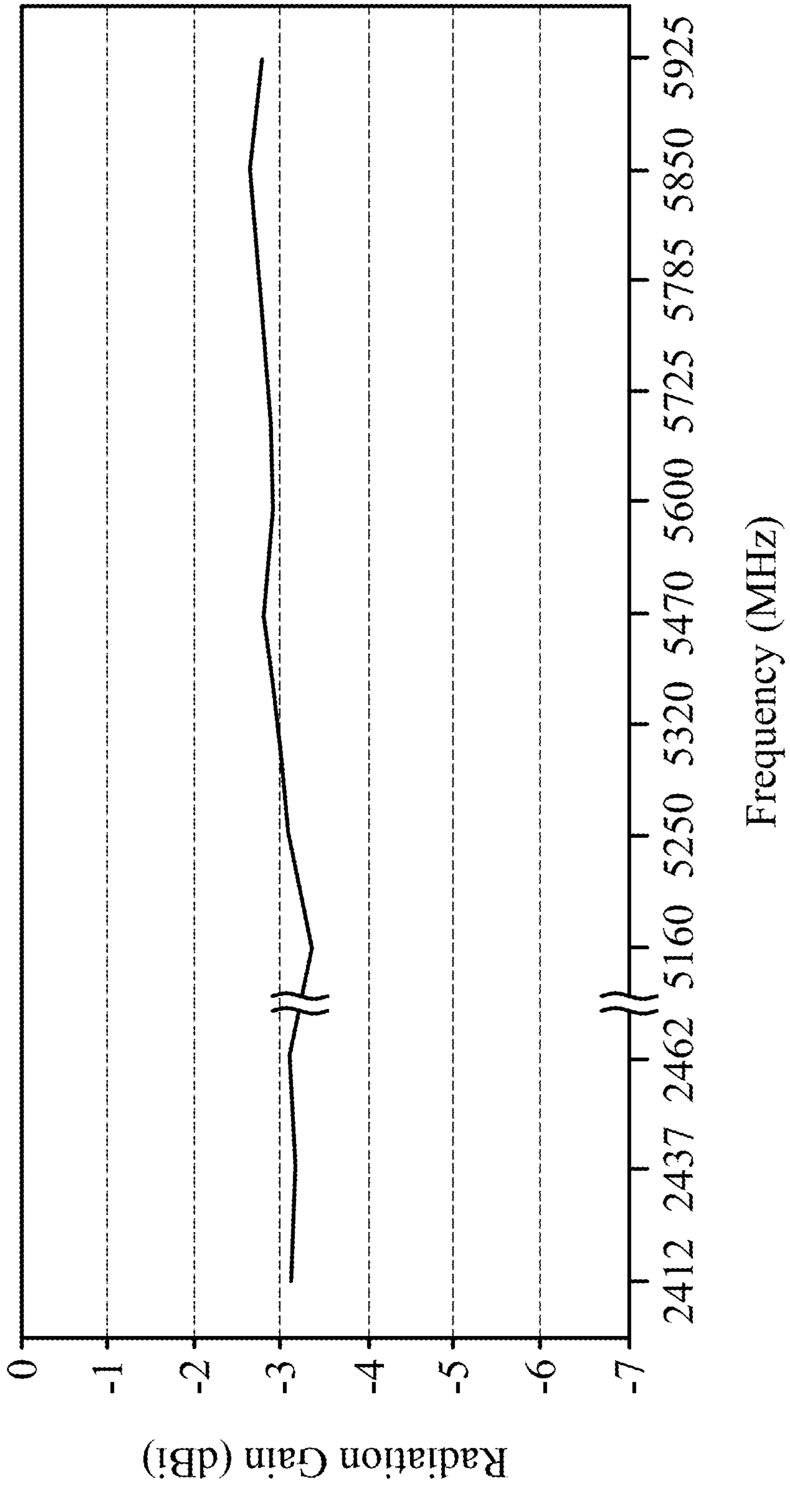
FIG. 3 is a diagram of radiation gain of an antenna structure of a mobile device according to an embodiment of the invention.

FIG. 3 is a diagram of radiation gain of the antenna structure 180 of the mobile device 100 according to an embodiment of the invention. The horizontal axis represents the operational frequency (MHz), and the vertical axis represents the radiation gain (dBi). According to the measurement of FIG. 3, the radiation gain of the antenna structure 180 of the mobile device 100 can reach −3 dBi or higher within the first frequency band FB1 and the second frequency band FB2 as mentioned above. It can meet the requirement of practical application of a general mobile communication device.

The element sizes in some embodiments of the mobile device 100 are as follows. The total length L1 of the main radiation element 140, the connection radiation element 150, and the auxiliary radiation element 160 may be substantially equal to 0.5 wavelength (λ/2) of the first frequency band FB1 of the antenna structure 180 of the mobile device 100. The length L2 of the main radiation element 140 may be substantially equal to 0.375 wavelength (3λ/8) of the first frequency band FB1 of the antenna structure 180 of the mobile device 100. The length L3 of the connection radiation element 150 may be from 1 mm to 3 mm. The length L4 of the auxiliary radiation element 160 may be shorter than or equal to 0.25 wavelength (λ/4) of the second frequency band FB2 of the antenna structure 180 of the mobile device 100. The total length L5 of the feeding radiation element 120 and the shorting radiation element 130 may be substantially equal to 0.25 wavelength (λ/4) of the second frequency band FB2 of the antenna structure 180 of the mobile device 100. The distance D1 between the main radiation element 140 and the metal mechanism element 110 may be shorter than or equal to 4.5 mm. The distance D2 between the auxiliary radiation element 160 and the metal mechanism element 110 may be from 3 mm to 3.5 mm. The distance D3 between the main radiation element 140 and the shorting radiation element 130 may be from 0.5 mm to 1.5 mm. The width W1 of the main radiation element 140 may be at least twice the width W2 of the connection radiation element 150. The width W1 of the main radiation element 140 may also be at least twice the width W3 of the auxiliary radiation element 160. For example, the aforementioned width W1 may be from 9 mm to 11 mm, and the aforementioned widths W2 and W3 may be from 3 mm to 4 mm. The above ranges of element sizes are calculated and obtained according to many experiment results, and they help to optimize the operational bandwidth, the impedance matching, and the radiation gain of the antenna structure 180 of the mobile device 100.

Figure 4:
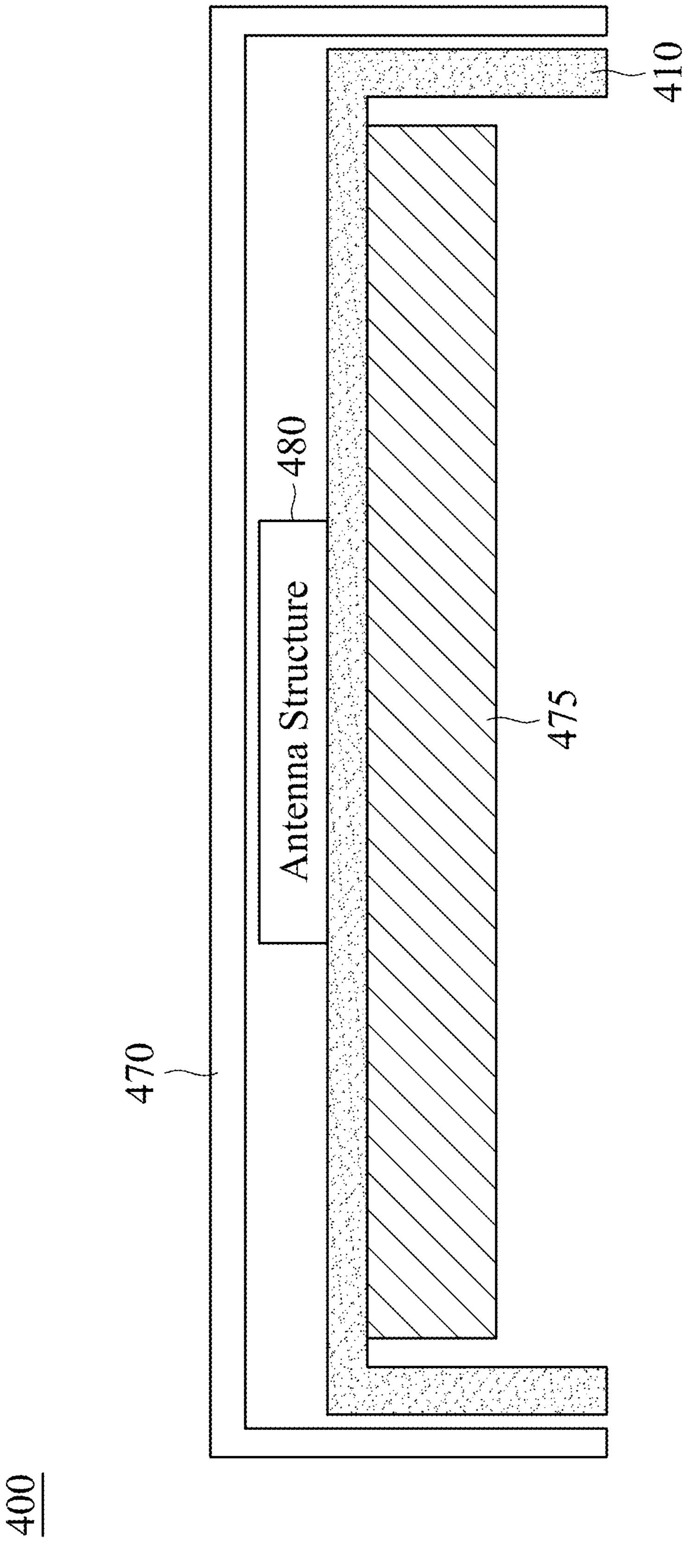
FIG. 4 is a sectional view of a mobile device according to an embodiment of the invention.

FIG. 4 is a sectional view of a mobile device 400 according to an embodiment of the invention. FIG. 4 is similar to FIG. 1. In the embodiment of FIG. 4, the mobile device 400 includes a metal mechanism element 410, a nonconductive cover element 470, a main circuit board 475, and an antenna structure 480. Specifically, the main circuit board 475 and its relative circuit components may all be disposed inside the hollow portion of the metal mechanism element 410, and the antenna structure 480 may be disposed at the edge of the metal mechanism element 410. Also, the nonconductive cover element 470 is configured to cover the metal mechanism element 410, the main circuit board 475, and the antenna structure 480. Since the antenna structure 480 has a relatively small antenna height, it can be easily disposed in the limited space between the nonconductive cover element 470 and the metal mechanism element 410. As a result, the mobile device 400 can still support the desired wideband operations of wireless communication, without additionally increasing the overall size. Other features of the mobile device 400 of FIG. 4 are similar to those of the mobile device 100 of FIG. 1. Accordingly, the two embodiments can achieve similar levels of performance.

The invention proposes a novel mobile device with a novel antenna structure. In comparison to the conventional design, the invention has several advantages, including its small size, wide bandwidth, low manufacturing cost, and high radiation gain. Therefore, the invention is suitable for application in a variety of electronic or communication devices.

Note that the above element sizes, element shapes, and frequency ranges are not limitations of the invention. An antenna designer can fine-tune these settings or values according to different requirements. It should be understood that the mobile device of the invention is not limited to the configurations of FIGS. 1-4 The invention may merely include any one or more features of any one or more embodiments of FIGS. 1-4 In other words, not all of the features displayed in the figures should be implemented in the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device supporting wideband operations, comprising:

a metal mechanism element, providing a ground voltage;

a feeding radiation element, having a feeding point;

a shorting radiation element, wherein the feeding radiation element is coupled through the shorting radiation element to the metal mechanism element;

a main radiation element, coupled to the feeding radiation element;

a connection radiation element, coupled to the main radiation element; and an auxiliary radiation element, coupled to the connection radiation element;

wherein an antenna structure is formed by the feeding radiation element, the shorting radiation element, the main radiation element, the connection radiation element, and the auxiliary radiation element;

wherein a width of the main radiation element is greater than that of the auxiliary radiation element;

wherein the main radiation element and the auxiliary radiation element are respectively disposed on two parallel planes.

2. The mobile device as claimed in claim 1, wherein the metal mechanism element is a host housing.

3. The mobile device as claimed in claim 1, wherein the antenna structure is disposed at an edge of the metal mechanism element.

4. The mobile device as claimed in claim 1, wherein the feeding radiation element and the main radiation element are respectively disposed on two orthogonal planes.

5. The mobile device as claimed in claim 1, wherein the connection radiation element is perpendicular to the main radiation element and the auxiliary radiation element.

6. The mobile device as claimed in claim 1, wherein the antenna structure covers a first frequency band and a second frequency band.

7. The mobile device as claimed in claim 6, wherein the first frequency band is from 2400 MHz to 2500 MHz.

8. The mobile device as claimed in claim 6, wherein the second frequency band is from 5150 MHz to 5850 MHz.

9. The mobile device as claimed in claim 6, wherein a total length of the main radiation element, the connection radiation element, and the auxiliary radiation element is substantially equal to 0.5 wavelength of the first frequency band.

10. The mobile device as claimed in claim 6, wherein a length of the main radiation element is substantially equal to 0.375 wavelength of the first frequency band.

11. The mobile device as claimed in claim 6, wherein a length of the auxiliary radiation element is shorter than or equal to 0.25 wavelength of the second frequency band.

12. The mobile device as claimed in claim 1, wherein a distance between the main radiation element and the metal mechanism element is shorter than or equal to 4.5 mm.

13. The mobile device as claimed in claim 1, wherein a length of the connection radiation element is from 1 mm to 3 mm.

14. The mobile device as claimed in claim 1, wherein the width of the main radiation element is from 9 mm to 11 mm.

* * * * *